(12) United States Patent
Barnes et al.

(10) Patent No.: US 12,543,839 B2
(45) Date of Patent: Feb. 10, 2026

(54) NAIL CLIPPER

(71) Applicant: ROOBI TECHNOLOGIES CORPORATION, Reston, VA (US)

(72) Inventors: Marcantonio Williams Barnes, Oakton, VA (US); Audrey Lynne Curry, Birmingham, AL (US); Gregory David Dubin, Birmingham, AL (US); Jackson Henry Hedden, Birmingham, AL (US)

(73) Assignee: Roobi Technologies Corporation, Reston, VA (US)

( * ) Notice: Subject to any disclaimer, the term of this patent is extended or adjusted under 35 U.S.C. 154(b) by 0 days.

(21) Appl. No.: 17/209,753

(22) Filed: Mar. 23, 2021

(65) Prior Publication Data

US 2022/0117370 A1 Apr. 21, 2022

Related U.S. Application Data

(60) Provisional application No. 63/146,258, filed on Feb. 5, 2021, provisional application No. 63/092,035, filed on Oct. 15, 2020.

(51) Int. Cl.
*A45D 29/02* (2006.01)
*A01K 13/00* (2006.01)
*B26B 17/02* (2006.01)

(52) U.S. Cl.
CPC .............. *A45D 29/02* (2013.01); *A01K 13/00* (2013.01); *B26B 17/02* (2013.01)

(58) Field of Classification Search
CPC ........ A45D 29/02; B26B 17/02; A01K 13/00; A01K 17/00

USPC ............... 30/26–28, 228; 119/601; 132/73.5; D28/60–62

See application file for complete search history.

(56) References Cited

U.S. PATENT DOCUMENTS

| | | | |
|---|---|---|---|
| 1,960,130 A | 5/1934 | George | |
| 2,323,621 A | 7/1943 | Elizabeth et al. | |
| 2,514,566 A | 7/1950 | Charles | |
| 2,955,354 A | 10/1960 | Charles | |

(Continued)

FOREIGN PATENT DOCUMENTS

| | | |
|---|---|---|
| CN | 200966423 Y | 10/2007 |
| CN | 218184646 U | 1/2023 |

(Continued)

OTHER PUBLICATIONS

International Search Report and Written Opinion corresponding to PCT/US2021/023657 Jun. 9, 2021.

(Continued)

*Primary Examiner* — Jason Daniel Prone
(74) *Attorney, Agent, or Firm* — COOLEY LLP

(57) ABSTRACT

Devices, systems, and methods for nail clipping, for example, animal nail clipping, include a nail clipper including a body for grasping by a user's hand. The body may define a clip space as an opening for insertion of a subject's nail for clipping. The clipper can include at least one blade coupled with the body for movement between a withdraw position retracted from the clip space and a clip position extended into the clip space for clipping, and a clipping control system including a sensor system for detecting non-shell material of a subject's nail within the clip space.

15 Claims, 10 Drawing Sheets

(56) References Cited

U.S. PATENT DOCUMENTS

| | | | |
|---|---|---|---|
| 3,838,507 A | 10/1974 | Clark | |
| 3,845,553 A | 11/1974 | Fields | |
| 4,082,016 A | 4/1978 | Vonusa | |
| 4,228,585 A * | 10/1980 | Nelson | A45D 29/02 30/29 |
| 4,791,725 A | 12/1988 | Amagaya | |
| D302,102 S | 7/1989 | Amagaya | |
| D308,462 S | 6/1990 | Komatsu | |
| D330,914 S | 11/1992 | Muller | |
| D347,776 S | 6/1994 | Brix-Hansen | |
| D428,784 S | 8/2000 | De Vries | |
| D435,318 S | 12/2000 | Rieser | |
| D460,582 S | 7/2002 | Rieser | |
| D462,002 S | 8/2002 | Jean et al. | |
| D479,967 S | 9/2003 | Schülein | |
| D491,776 S | 6/2004 | Kehoe | |
| 7,000,321 B1 * | 2/2006 | Rodgers | A01K 13/00 30/29 |
| 7,077,039 B2 * | 7/2006 | Gass | B23Q 11/0082 83/DIG. 1 |
| 7,124,669 B1 | 10/2006 | Rodgers | |
| 7,137,356 B2 * | 11/2006 | Huggans | A01K 13/00 119/601 |
| 7,217,001 B2 * | 5/2007 | Vrsalovic | A45D 29/02 132/73.5 |
| 7,254,854 B2 | 8/2007 | Yonenoi | |
| D574,111 S | 7/2008 | Park | |
| 7,464,665 B1 * | 12/2008 | Rogers | A01K 13/00 119/600 |
| D603,682 S | 11/2009 | Brands | |
| 7,640,892 B2 * | 1/2010 | Huggans | A01K 13/00 119/601 |
| D630,079 S | 1/2011 | Seeds et al. | |
| D630,080 S | 1/2011 | Seeds et al. | |
| D636,249 S | 4/2011 | Manchen | |
| D643,269 S | 8/2011 | Mah et al. | |
| 8,100,088 B2 * | 1/2012 | Manheimer, III | A01K 13/00 119/601 |
| 8,156,900 B1 * | 4/2012 | Gaunt | A01K 17/00 119/601 |
| D665,438 S | 8/2012 | Jim | |
| D693,195 S | 11/2013 | Poure | |
| D746,658 S | 1/2016 | Mihailides | |
| D805,867 S | 12/2017 | Seiders et al. | |
| 9,848,581 B1 | 12/2017 | Dahlquist | |
| 10,076,173 B1 * | 9/2018 | Kaidi | A45D 29/02 |
| D847,597 S | 5/2019 | Cotan | |
| 10,506,796 B1 | 12/2019 | Lee | |
| D873,641 S | 1/2020 | Ozturk et al. | |
| D903,953 S | 12/2020 | Liu | |
| D905,797 S | 12/2020 | Justin | |
| D908,983 S | 1/2021 | Zhao | |
| D933,906 S | 10/2021 | Zhu | |
| D952,963 S | 5/2022 | Lee | |
| D964,133 S | 9/2022 | Hume et al. | |
| D972,904 S | 12/2022 | Chuang et al. | |
| D975,375 S | 1/2023 | Barnes et al. | |
| D976,298 S | 1/2023 | Wang | |
| D1,011,650 S | 1/2024 | Barnes et al. | |
| D1,064,445 S * | 2/2025 | Barnes | D30/158 |
| 2004/0163607 A1 | 8/2004 | Dunn et al. | |
| 2005/0132975 A1 | 6/2005 | Huggans | |
| 2006/0042559 A1 | 3/2006 | Kang | |
| 2006/0180169 A1 * | 8/2006 | Lund | A45D 29/02 132/73.5 |
| 2007/0137041 A1 * | 6/2007 | Manheimer | A01K 13/00 30/29 |
| 2007/0163514 A1 | 7/2007 | Huggans | |
| 2010/0107989 A1 | 5/2010 | Manheimer, III | |
| 2011/0005537 A1 * | 1/2011 | Hsu | A45D 29/02 30/28 |
| 2016/0066542 A1 * | 3/2016 | Kearns | A45D 29/02 30/29 |
| 2016/0330937 A1 | 11/2016 | Peschardt | |
| 2017/0164715 A1 | 6/2017 | Edwards | |
| 2017/0355027 A1 * | 12/2017 | D-Antuono | B23D 35/002 |
| 2019/0380308 A1 | 12/2019 | Bihlmaier et al. | |
| 2022/0386753 A1 * | 12/2022 | Axelrod | A45D 29/02 |
| 2022/0408897 A1 | 12/2022 | Barnes et al. | |
| 2023/0052319 A1 | 2/2023 | Barnes et al. | |
| 2023/0225288 A1 | 7/2023 | Barnes et al. | |

FOREIGN PATENT DOCUMENTS

| | | | |
|---|---|---|---|
| EP | 2856476 A1 | 4/2015 | |
| EP | 2856476 B1 | 12/2020 | |
| GB | 809845 A * | 3/1959 | A45D 29/02 |
| JP | D1709144 | 3/2022 | |
| JP | 1718566 | 6/2022 | |
| JP | 2024530246 A * | 8/2024 | A01K 13/00 |
| KR | 20090048660 A | 5/2009 | |
| KR | 20240070527 A * | 5/2024 | A01K 13/00 |
| RU | 00134299 | 11/2022 | |
| WO | WO-2022081199 A1 | 4/2022 | |
| WO | WO-2022272027 A1 | 12/2022 | |
| WO | WO-2023022938 A1 | 2/2023 | |
| WO | WO-D221108001 | 2/2023 | |
| WO | WO-D221108002 | 2/2023 | |
| WO | WO-2023133493 A1 | 7/2023 | |

OTHER PUBLICATIONS

European Examination Report corresponding to EP0087000603-0001 dated Sep. 24, 2021, 6 pages.

International Search Report and Written Opinion for Application No. PCT/US2022/034849, mailed on Oct. 5, 2022, 10 pages.

International Search Report and Written Opinion corresponding to PCT/US2022/040200 dated Nov. 29, 2022, 14 pages.

International Search Report and Written Opinion for International Application No. PCT/US2023/060216 dated Mar. 31, 2023, 18 pages.

SafetyPawz homepage, archived Oct. 18, 2021, retrieved Apr. 13, 2023 [online], URL: https://web.archive.org/web/20211018042211 https://safetypawz.com/ (Year: 2021), 4 pages.

"The S01 Pet Nail Clipper . . . Quiet, Fast, Safe!," Kickstarter campaign, last updated Oct. 6, 2021, retrieved Apr. 13, 2023 [online], URL: https://www.kickstarter.com/projects/safetypawzs01/pet-nail-clipping-reimagined (Year: 2021), 9 pages.

International Preliminary Report on Patentability for International Application No. PCT/US2022/034849 dated Jan. 4, 2024, 8 pages.

International Preliminary Report on Patentability for International Application No. PCT/US2022/040200 dated Feb. 29, 2024, 10 pages.

* cited by examiner

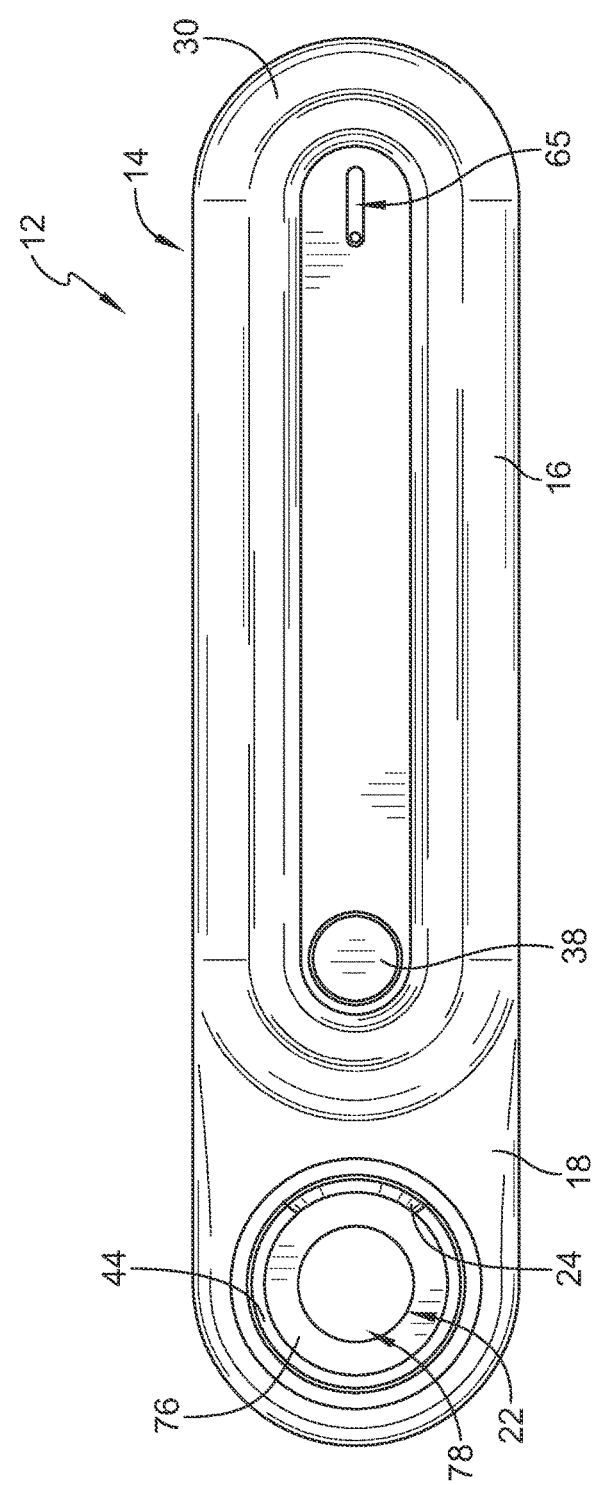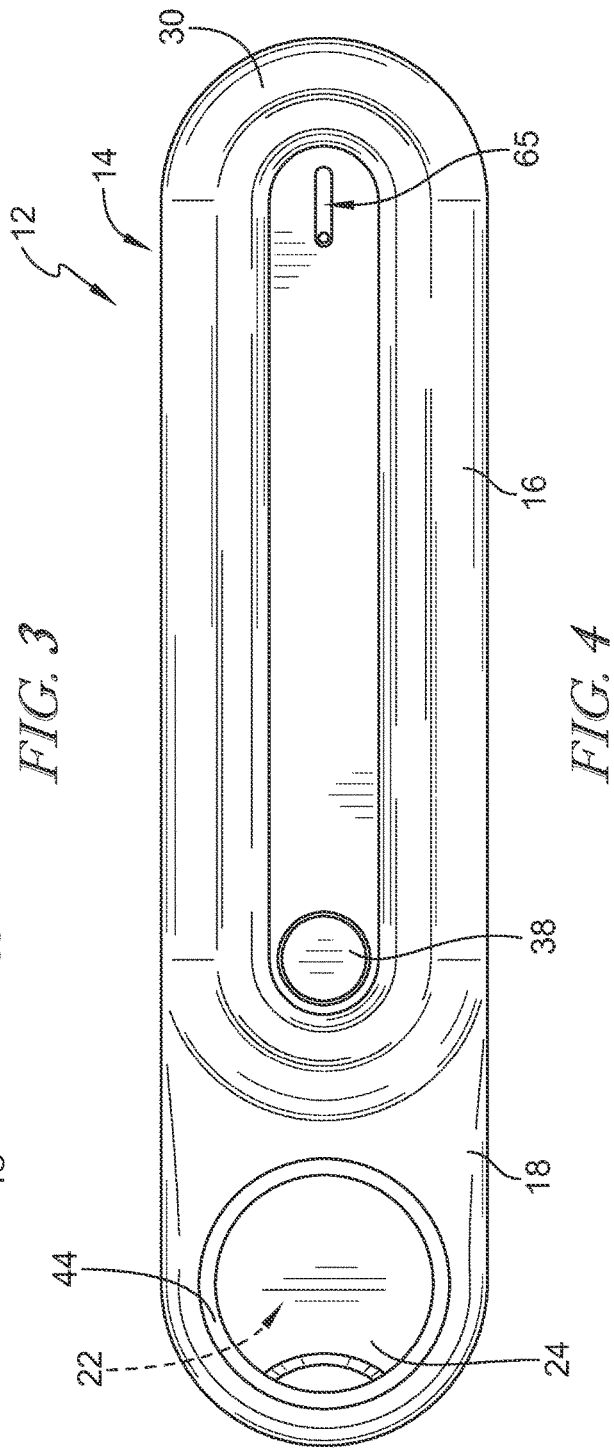

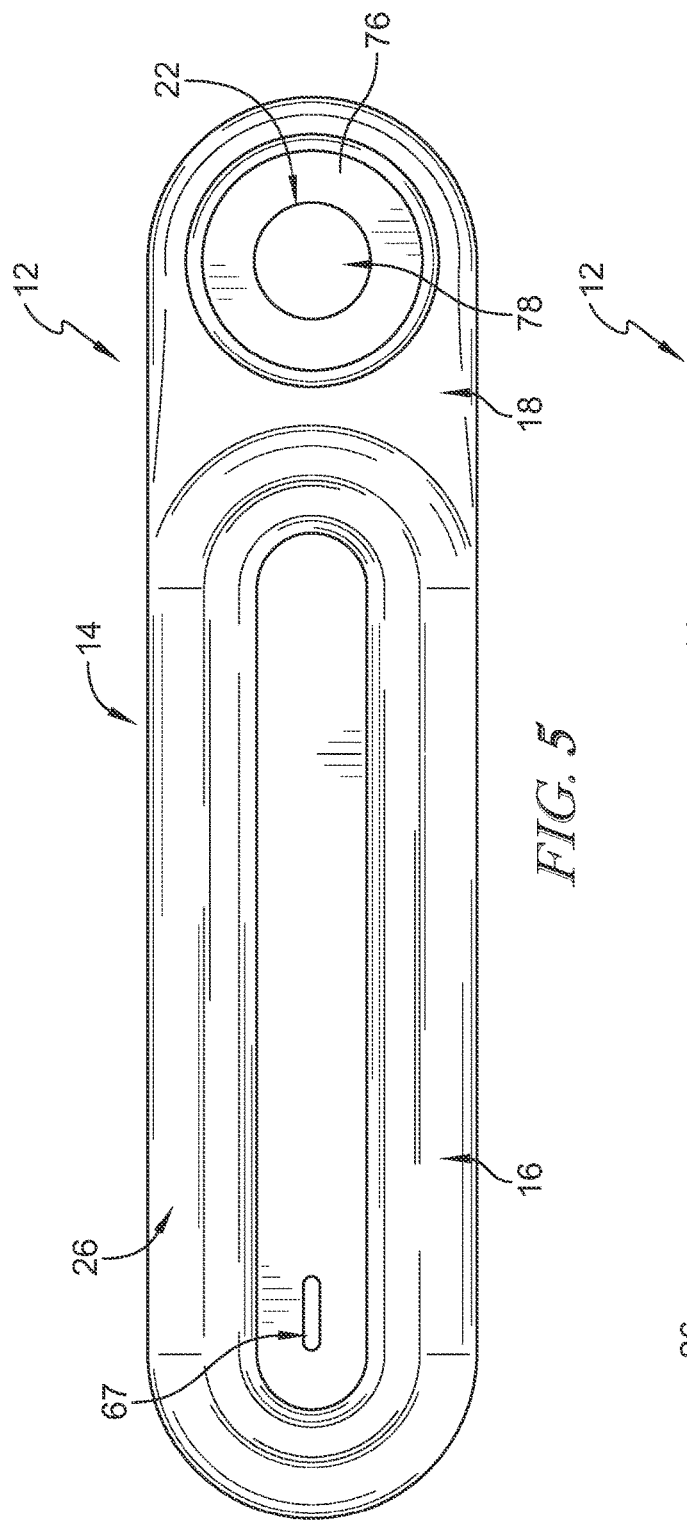
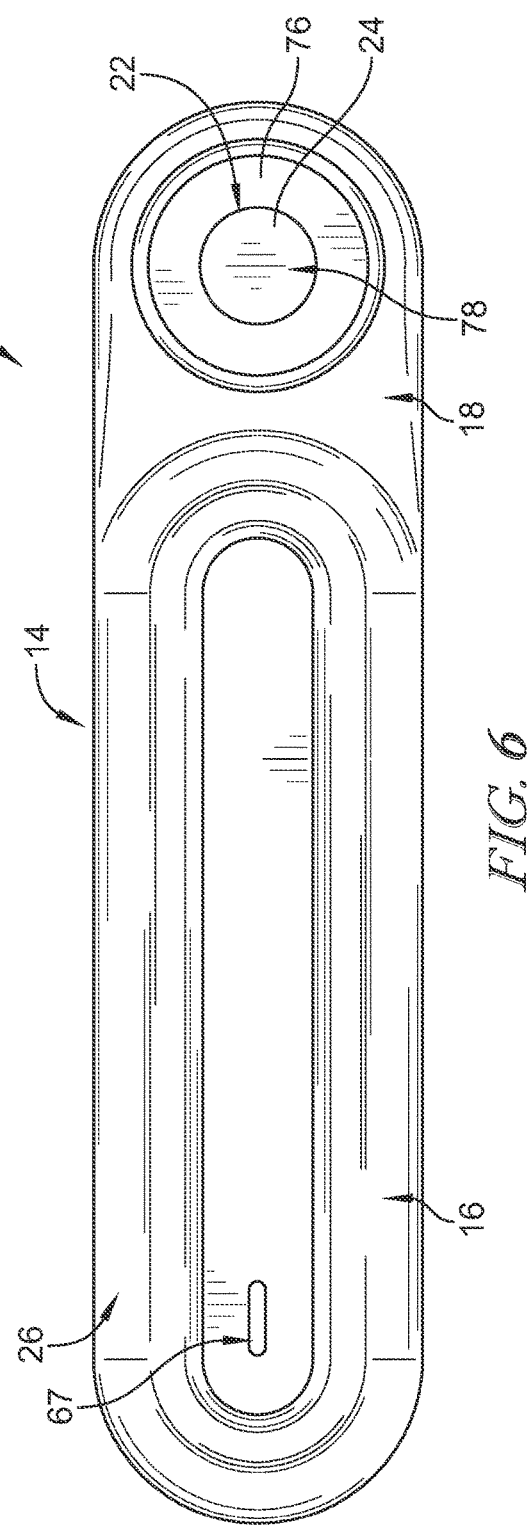
FIG. 5
FIG. 6

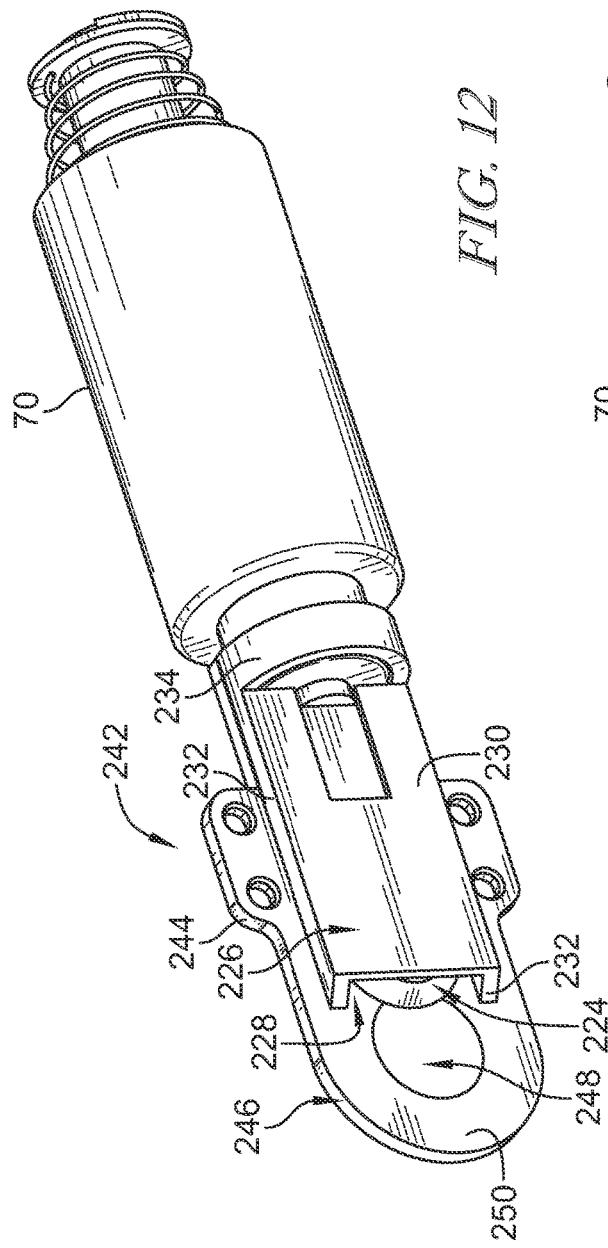
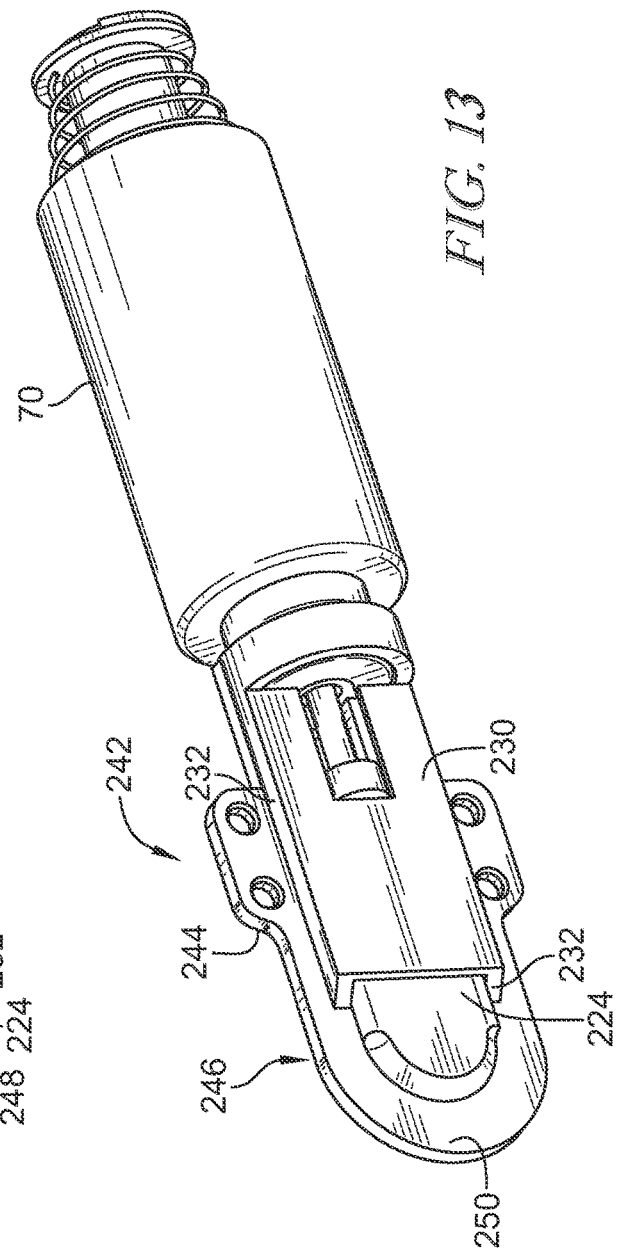

NAIL CLIPPER

CROSS-REFERENCE

This U.S. Non-provisional Patent application claims the benefit of priority to each of U.S. Provisional Patent Application No. 63/092,035, filed on Oct. 15, 2020, entitled Pet Nail Cutting, and U.S. Provisional Patent Application No. 63/146,258, filed on Feb. 5, 2021, entitled Pet Nail Clipper, the disclosure of each of which is hereby incorporated by reference, in their entireties, including but without limitation, those portions concerning nail clipping.

FIELD

The present disclosure relates to devices, systems, and methods for clipping. More specifically, the present disclosure relates to devices, systems, and methods for nail clipping.

Grooming, for example, grooming animals, can be challenging regardless of the subject's temperament. However, many subjects can experience stress and/or anxiety during grooming activities. Stress and/or anxiety in the subject can increase agitation and/or activity of the subject. Additionally, even without undue stresses, subjects can be active during grooming. Grooming activities can be awkward and/or physically demanding on the groomer.

Reducing challenges to the subject and/or groomer can enhance the grooming process and/or results. Nail clipping can be particularly challenging for sensitive subjects. Nail clipping can involve sharp instruments and can require fine operations. Compounded with the subject's temperament, careful clipping of a subject's nails can be challenging.

SUMMARY

The present application discloses one or more of the features recited in the appended claims and/or the following features which, alone or in any combination, may comprise patentable subject matter.

According to an aspect of the present disclosure, a nail clipper may include a body for grasping by a user's hand, the body defining a clip space as an opening for insertion of a subject's nail for clipping, at least one blade coupled with the body for movement between a withdraw position retracted from the clip space and a clip position extended into the clip space for clipping, and a clipping control system including a sensor system for detecting non-shell material of a subject's nail within the clip space. In some embodiments, the clipping control system may include an activation button for actuation of the at least one blade between the withdraw position and the clip position.

In some embodiments, the clipping control system may be configured to block against movement of the at least one blade between the withdraw position and the clip position in response to detection of non-shell material within the clip space. Configuration to block against movement of the at least one blade may include configuration to disable the actuation button. The nail clipper may further include an actuator engaged with the at least one blade to drive the at least one blade between the withdraw position and the clip position. The actuator may be a power actuator. The power actuator may be configured to use electrical power to drive the at least one blade. In some embodiments, the actuator is a linear actuator.

In some embodiments, responsive to user activation of the activation button, the clipping control system may be configured to control the actuator to drive the at least one blade for movement between the withdraw position and the clip position. The clipping control system may be configured to block against movement of the at least one blade out from the withdraw position, responsive to detection of non-shell material within the clip space.

In some embodiments, responsive to detection of non-shell material within the clip space, the clipping control system may be configured to block against movement of the at least one blade out from the withdraw position even under user activation of the activation button. Configuration to block against movement of the at least one blade out from the withdraw position may include blocking power to the actuator. Configuration to block against movement of the at least one blade out from the withdraw position may include at least one of disabling the activation button and arranging a lock in a lock position to block movement of the at least one blade out from the withdraw position.

In some embodiments, the clipping control system may be configured to enable operation of the actuator for driving the at least one blade for movement out from the withdraw position, responsive to detection of no non-shell material within the clip space. In some embodiments, the clipping control system may include an indicator. The control system may be configured to operate the indicator to alert the user that no non-shell material is within the clip space.

In some embodiments, the clipping control system may include an indicator, and the control system may be configured to operate the indicator to alert the user that non-shell material is within the clip space, responsive to detection by the sensor system of non-shell material of a subject's nail within the clip space.

In some embodiments, the nail clipper may further include a guide arranged at the clip space. The guide may be formed of resilient material for providing resilient contact with the subject's nail for positioning within the clip space. The guide may define an insertion space corresponding with the clip space to receive insertion of the subject's nail through the insertion space into the clip space. In some embodiments, the guide may be formed as an annular member defining the insertion space therein.

In some embodiments, the body may include a frame defining at least one portion of the clip space. The frame may be formed as a rigid member for maintaining the subject's nail in position for clipping by the at least one blade. The frame may be arranged adjacent the at least one blade. The frame may include an annular member defining the at least one portion of the clip space. In some embodiments, the at least one blade may be arranged to sheer with the annular member along the clip space under movement between the withdraw position and the clip position.

In some embodiments, the sensor may be arranged on a side of the frame opposite the at least one blade. The sensor may be arranged on a side of the frame from which the subject's nail is inserted into the clip space. In some embodiments, the sensor may be arranged on the same side of the frame as the at least one blade. The sensor may be arranged on a side of the frame away from which the subject's nail is inserted into the clip space.

In some embodiments, the at least one blade may includes a blade tip defining a clip surface. The clip surface may include a bevel. The clip surface may be defined with curvature. The clip surface may be formed concave. In some embodiments, the clip surface may be formed convex.

In some embodiments, the body may be elongated to define a handle for grasping by the user's hand. The clip space may be defined by an extension of the body from the handle on one end of the body. In some embodiments, the activation button may be coupled with the body on a side thereof oriented parallel with a direction of insertion of the subject's nail into the clip space.

In some embodiments, the sensor may be configured to generate a field. The sensor may be configured to sense threshold disturbance of the field to detect the presence of non-shell material within the clip space. In some embodiments, the sensor may be configured to detect blood cell density and/or width of the subject's nail.

In some embodiments, non-shell material of the subject's nail may be defined to include the subject's quick. In some embodiments, the nail clipper may be an animal nail clipper. The nail clipper may be a pet nail clipper.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 3 is a top plan view of the nail clipper of FIGS. 1 and 2 showing that a clipping blade is arranged in a withdraw position;

FIG. 4 is a top plan view of the nail clipper of FIGS. 1-3 showing that the clipping blade is arranged in a clipping position;

FIG. 5 is a bottom plan view of the nail clipper of FIGS. 1-4 showing that the clipping blade is arranged in the withdraw position;

FIG. 6 is a bottom plan view of the nail clipper of FIGS. 1-5 showing that the clipping blade is arranged in the clipping position;

FIG. 12 is a perspective view of another embodiment of a clipping blade and frame of the nail clipper of FIGS. 1-6 showing that the clipping blade is in a withdraw position, and showing that an actuator is coupled with the clipping blade for actuation;

FIG. 13 is a perspective of the clipping blade and frame of the nail clipper of FIG. 12 showing that the actuator has moved the clipping blade into a clipping position.

DETAILED DESCRIPTION

Figure 1:
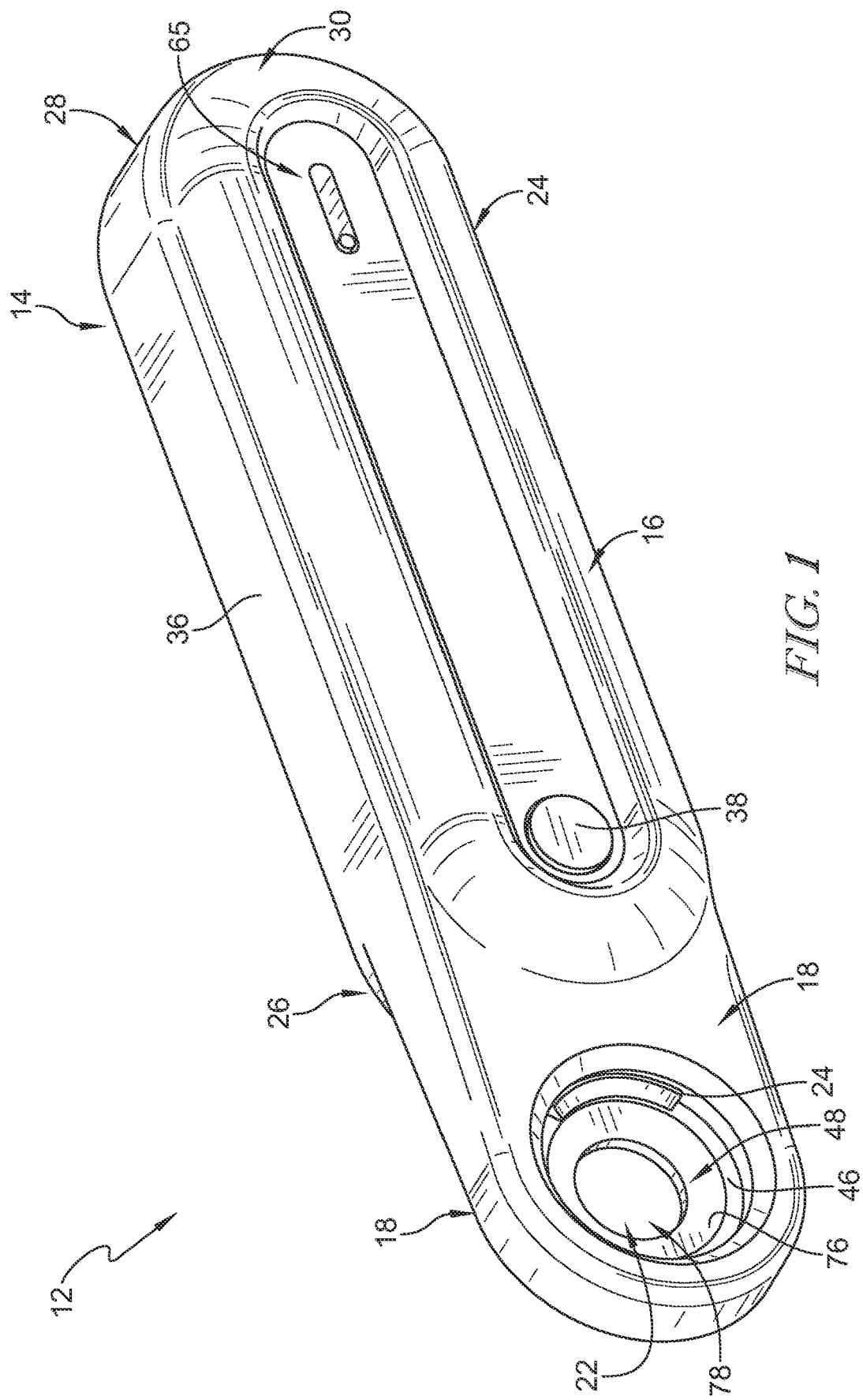
FIG. 1 is perspective view of a nail clipper showing that the clipper includes a body for grasping by the user's hand, the body defining a clip space for receiving the subject's nail.

For the purposes of promoting an understanding of the principles of the disclosure, reference will now be made to a number of illustrative embodiments illustrated in the drawings and specific language will be used to describe the same.

Nail clipping can be a particularly challenging part of grooming. For example, in animal nail clipping, such as dog nail clipping, the subject subject's nail can be required to remain steady while relatively sharp instruments are applied with fine control. At a minimum, the subject's appendage (hand, foot, paw) must be partly controlled (restrained) from undesirable movements during the clipping. Many subjects can experience stress and/or anxiety under such restraining which can lead to nervousness and/or excitement, exacerbating the challenges. Moreover, large and/or powerful subjects can be quite challenging to safely control for such fine work, even without undue stress.

Additionally, particular care must be taken in clipping nails. Many subjects, including dogs (and even humans) have nails which include the hyponychium, commonly known as a "quick." The quick is generally a portion of soft tissue beneath the harder nail plate or shell material, and can include the vascularized core of the nail. The human quick is beneath the nail plate or shell, while in dogs and other animals, the quick can be encompassed (within) the nail shell or plate.

While the nail shell itself can be safely trimmed, care should be taken not to trim the quick itself or even to trim the nail shell too close to the quick, which can cause injury and/or bleeding. Accordingly, it is important to consult an appropriate physician before trimming. Nevertheless, it can be appreciated that proper trimming of a subject's nail is challenging on its own, and yet can face challenges, such as those mentioned above. The groomer can be required to forcibly maintain a subject's appendage in position while finely trimming the nail shell at the appropriate position. This contrast of strength for maintaining restraint, and fine working for appropriate trimming, can be quite challenging. Additionally, some subjects (e.g., infants, patient subjects with ailments sensitive to nail clipping) may be particularly sensitive to improper clipping, for example, inadvertent clipping of the quick. Accordingly, proper nail clipping can be challenging.

Referring to FIG. 1, a nail trimming system is illustratively embodied as a nail clipper 12. The nail clipper 12 includes a body 14 formed for grasping by the user's hand. The body 14 includes a handle 16 and a head 18 projecting from the handle 16 on one end of the body 14. The handle 16 is illustratively formed as an elongated portion of the body 14 for comfortable grasping by the user's hand. The head 18 defines a clip space 22 for receiving insertion of the subject's nail for clipping.

The clip space 22 is formed as an opening in the body 14 for receiving the subject's nail. In the illustrative embodiment as shown in FIG. 1, the clip space 22 is defined by the annular interior of the head 18 of the body 14. The clip space 22 is wholly encircled by the body 14, but in some embodiments, may be only partly encircled.

A clipping blade 24 is arranged within the clipping space 22 for clipping operation. As discussed in additional detail herein, the clipping blade 24 is coupled with the body 14 for movement between a withdraw position, as shown in FIG. 1, and a clip position extended to clip a subject's nail positioned within the clipping space 22. The nail clipper 12 can provide detection of the subject's quick present within the clipping space 22 to reduce the risk of inadvertent damage to the subject's quick, as discussed in additional detail herein.

Figure 2:
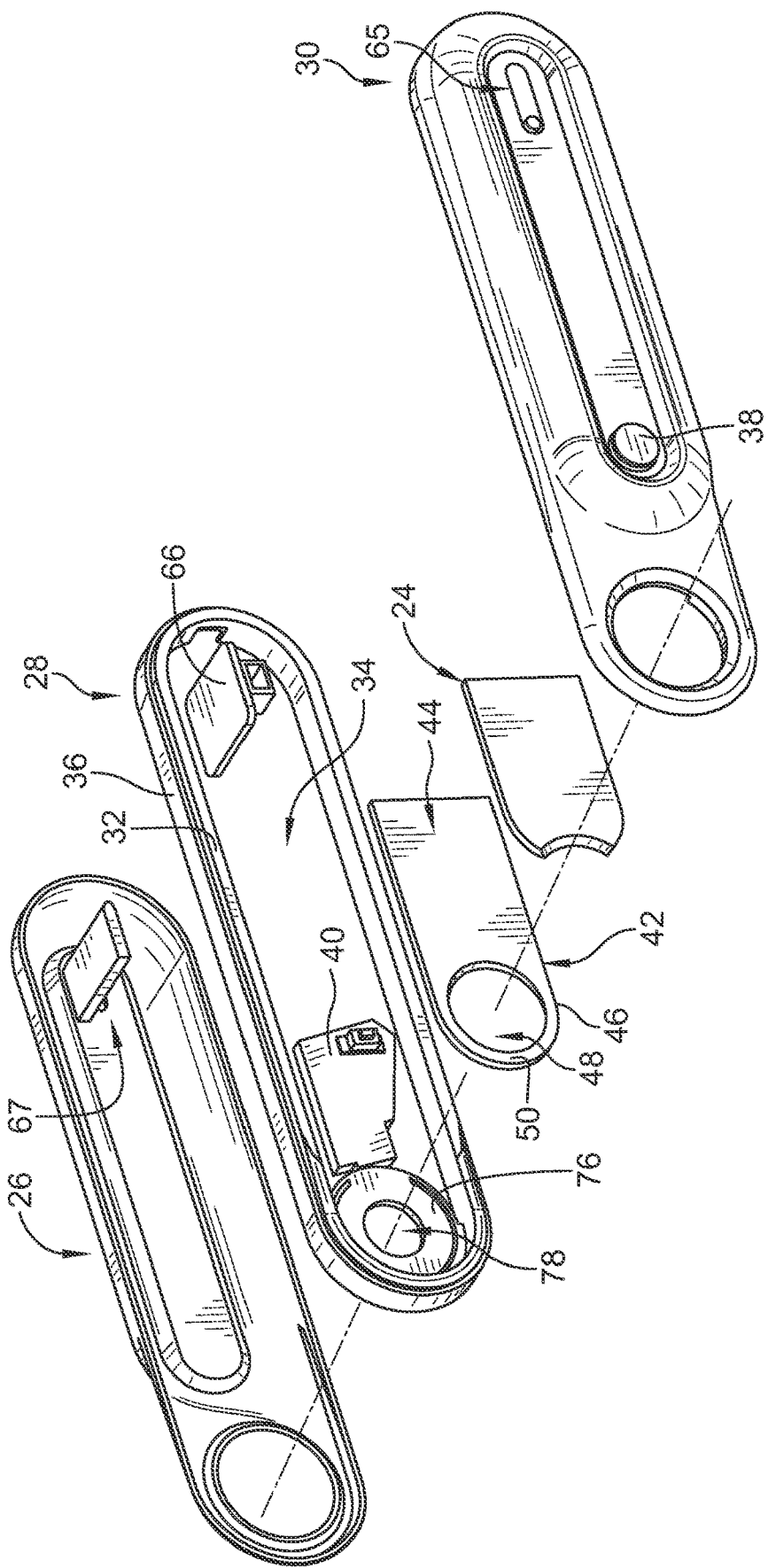
FIG. 2 is a perspective exploded view of portions of the nail clipper of FIG. 1.

Referring now to FIG. 2, the nail clipper 12 is shown partly exploded for ease of description. The body 14 illustratively comprises a rear portion 26, central portion 28, and front portion 30. When assembled together the rear portion 26 abuts the central portion 28 on a rear side thereof, and the front portion abuts the central portion 28 on a front side thereof, such that the central portion 28 is between the front and rear portions 26, 30. In the illustratively embodiment, the rear portion 26, central portion 28, and front portion 30 collectively define the handle 16 and head 18 of the body 14. In some embodiments, the body 14 may be formed of any suitable number of portions, for example, but without limitation, only two portions comprising front and rear portions abutting each other. The body portions 26, 28, 30 collectively define an internal space for housing other components, as discussed in additional detail herein.

The central portion 28 includes a base 32 forming a rigid portion of the body 14. The base 32 is illustratively formed as an annual member separating the front and rear portions 26, 30 and defining an open interior 34 for other components. The central portion 28 includes an indicator 36.

The indicator 36 is illustratively embodied as an LED light secured on an exterior of the base 32. The indicator 36 can communicate when clipping operation is available to the user, as discussed in additional detail herein. The indicator 36 as an LED light illustratively wraps around the base 32, and consequently around the longitudinal (circumferential) exterior of the body 14 when assembled.

Still referring to FIG. 2, the nail clipper 12 includes an activation button 38 for user activation for clipping. The activation button 38 is arranged to extend from (through) the front portion 30 of the body 14. In the illustrative embodiment, the user can select the activation button 38 by depressing the button 38 to initiate clipping.

Referring now to FIG. 3, the nail clipper 12 is shown having the blade 24 in the withdraw position. In the illustrative embodiment, the withdraw position is a default position for the blade 24. In FIG. 4, the blade 24 has been moved into the clipping position. In the clipping position, the blade 24 has extended through the clip space 22 to clip a subject's nail. In FIG. 5, the nail clipper 12 is again shown with the blade 24 in the withdraw position, similar to FIG. 3, but with a rear view. In FIG. 6, the nail clipper 12 is shown with the blade 24 in the clipping position, similar to FIG. 4, but with a rear view.

Returning to FIG. 2, the nail clipper 12 includes a sensor system including a sensor 40 for detecting the presence of material, other than the nail shell, within the clip space 22. The sensor 40 is illustratively embodied as a field sensor configured to generate a magnetic field and to detect changes to the field. For example, introduction of objects within the field cause disturbances to the field which can be detected by the sensor 40. In some embodiments, the detection of non-shell material, and more specifically the subject's quick, may be provided by any suitable manner, including but without limitation, light, sound, electrical, and/or magnetic sensor.

The sensor 40 is configured to determine whether any non-shell material, and specifically whether any of the subject's quick, is positioned within the clip space 22. For example, the sensor 40 can detect the density and/or thickness of materials within the clip space 22, such that when only the subject's nail shell (but not the quick) is within the clip space 22, clipping can be performed, and when the subject's quick is within the clip space 22, the sensor 40 can detect the difference in density (and/or thickness) corresponding to the quick relative to the nail shell alone to avoid clipping while the subject's quick is within the clip space 22. The nail clipper 12 can thus determine whether the subject's quick is within the clip space 22 to avoid unintended clipping which could injure the subject's quick.

Responsive to detection of non-shell material, for example the subject's quick, within the clip space 22, the indicator 36 can communicate to alert the user to the presence of non-shell material. The indicator 36 illustratively embodied as an LED light is configured to illuminate to indicate the presence of non-shell material within the clip space 22. In the illustrative embodiment, the indicator 36 is configured to illuminate with red color to indicate presence of non-shell material within the clip space 22 to alert the user that clipping should not be performed. In the illustrative embodiment, the indicator 36 illuminates with green color when no non-shell material is present within the clip space 22 and that clipping is permitted, based on the sensor 40. When clipping is permitted, the user may actuate the activation button 38 to operate the blade 24 for clipping in the clip space 22.

In some embodiments, the indicator 36 may be configured to remain de-illuminated when no non-shell material is present within the clip space 22, and to illuminate (e.g., with red color) to indicate presence of non-shell material within the clip space 22, based on sensor 40; or may be configured to illuminate (e.g., with green color) when no non-shell material is present within the clip space 22, and to de-illuminate to indicate presence of non-shell material within the clip space 22, based on sensor 40, to alert the user that clipping should not be performed.

Referring still to FIG. 2, the body 14 includes a frame 42 formed as a rigid member for maintaining the subject's nail in position for clipping by the blade 24. The frame 42 includes a base 44 secured with the handle 16 and a head 46 extending from connection with the base 44.

The head 46 of the frame 42 defines an opening 48 forming at least a portion of the clip space 22. The head 46 illustratively includes a rim 50 defining the opening 48. The rim 50 is illustratively formed annularly about the opening 48. The rim 50 is illustratively formed to wholly encircle the opening 48, although in some embodiments, may only partially encircle the opening 48.

In the illustrative embodiment, the frame 42 remains stationary relative to the blade 24, during movement of the blade 24 between the withdraw and clip positions. The frame 42 is positioned adjacent the blade 24. The frame 42 being in close proximity with the blade 24 such that the blade 24 is arranged to sheer with the rim 50 along the clip space 22 under movement between the withdraw and the clip positions. Sheering between the blade 24 and frame 42 can assist in clipping with the frame 42 maintaining the position of the subject's nail, for example as a stop for counterforce, while the blade 24 conducts clipping. In some embodiments, a counterforce for clipping may be provided by use of more than one blade. Although the blade 24 is arranged for shearing with the frame 42, in some embodiments, the blade 24 may be arranged with tight tolerance relative to the frame 42 without specific contact therewith for clipping.

Figure 8:
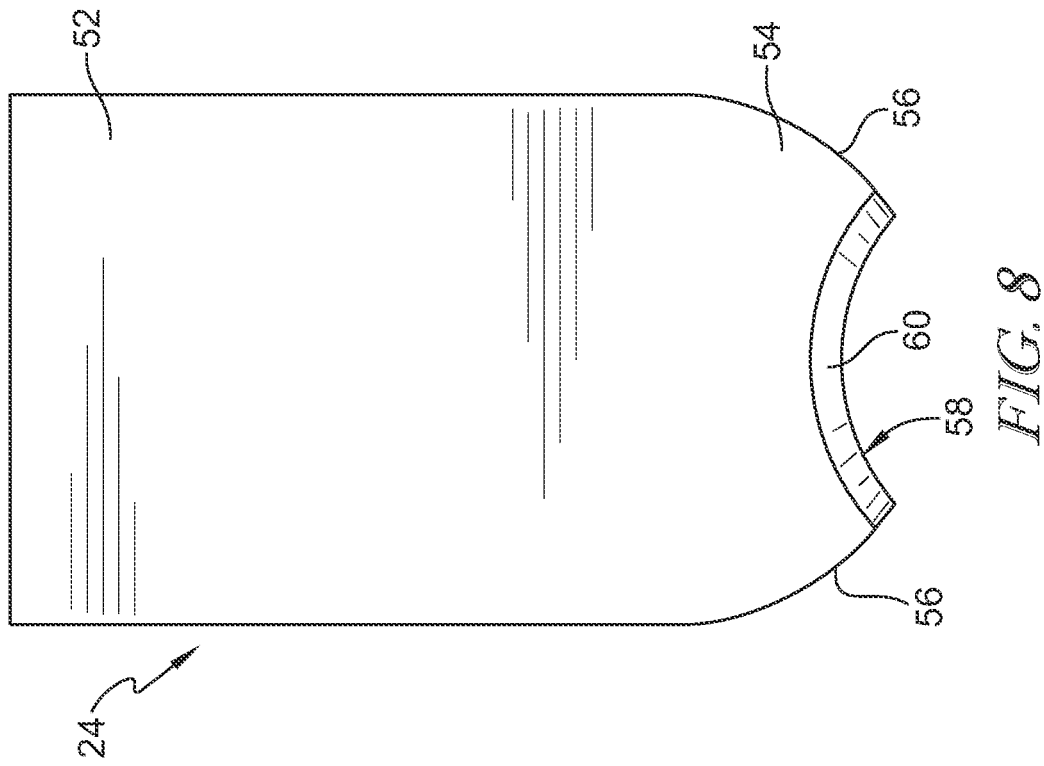
FIG. 8 is a top plan view of the clipping blade of the nail clipper of FIGS. 1-6.
Figure 7:
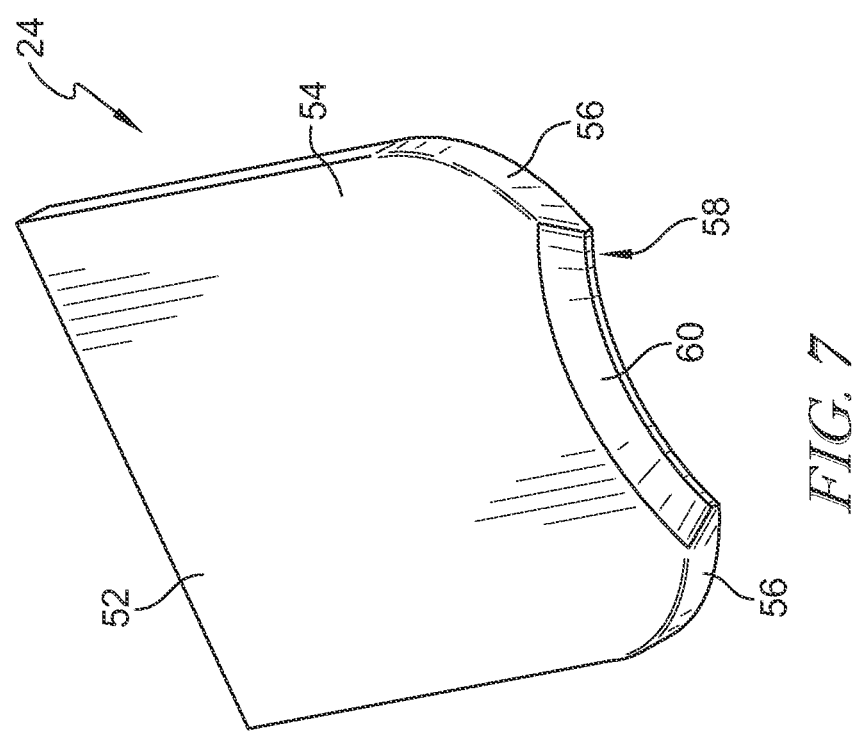
FIG. 7 is a perspective view of the clipping blade of the nail clipper of FIGS. 1-5.

Referring to FIGS. 7 and 8, the blade 24 includes a base 52 and a head 54 extending from the base 52. The base 52 is generally arranged within the body 14 with the head 54 near the clip space 22 (as shown in FIG. 1). The head 54 is illustratively formed having a tapered outer edge 56.

The blade 24 includes a blade tip 58 formed on the head 54. The blade tip 58 defines a clip surface 60 for clipping. The clip surface 60 includes a bevel. The clip surface 60 is illustratively defined with curvature. The curvature of the clip surface 60 is formed concave. The concave curvature of the clip surface 60 can assist in clipping by encouraging inwardly directed force towards a focal point, which can assist in reducing movement of the subject's nail during clipping.

Figure 9:
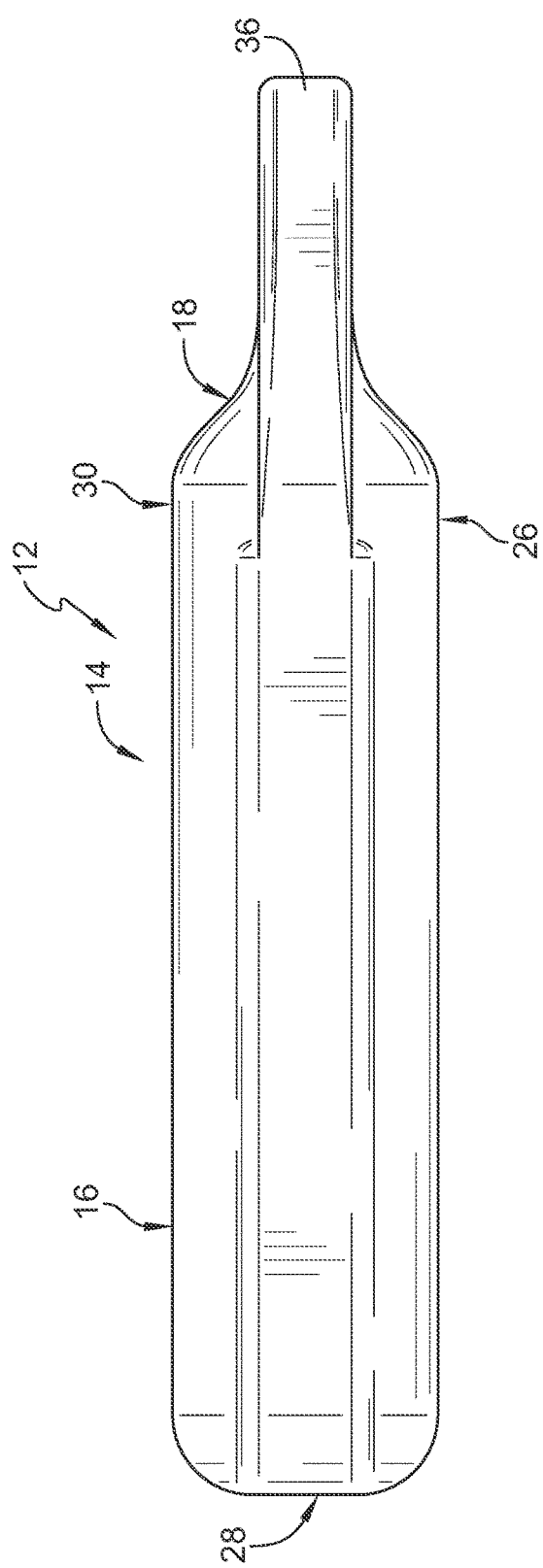
FIG. 9 is a left side elevation view of the nail clipper of FIGS. 1-7.
Figure 10:
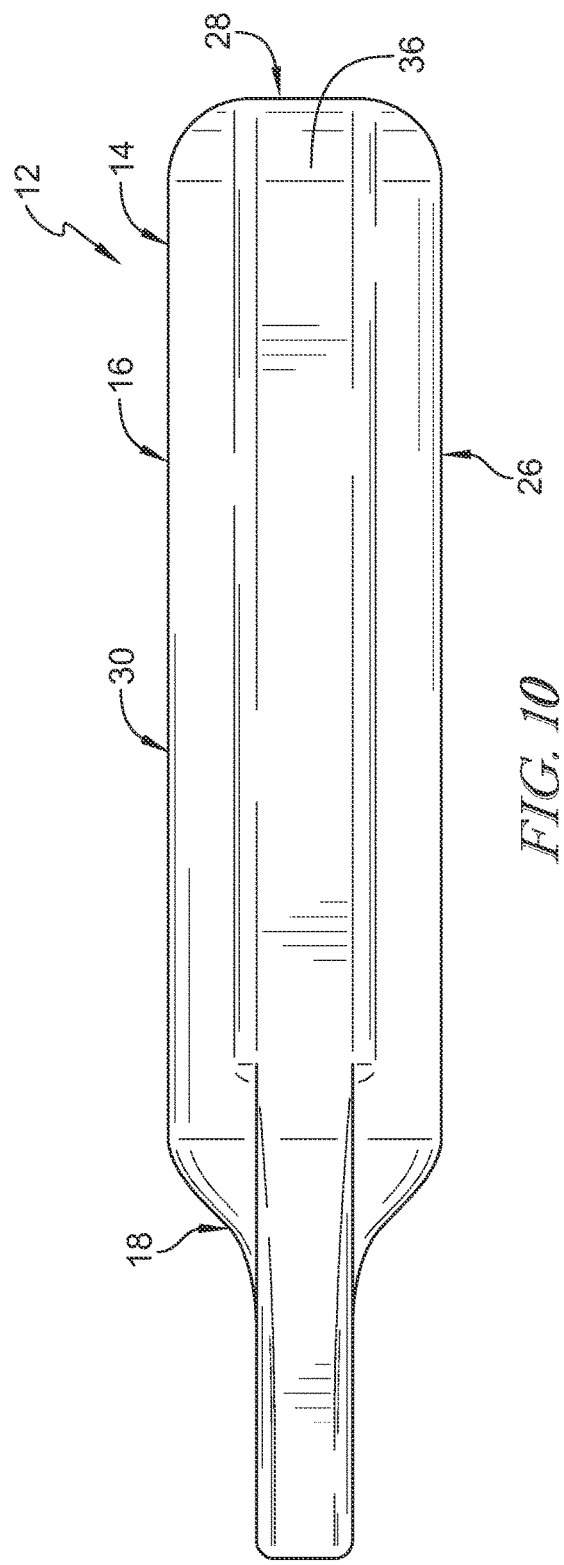
FIG. 10 is a right side elevation view of the nail clipper of FIGS. 1-7 and 9.

FIGS. 9 and 10 illustrate the left and right sides of the nail clipper 12. In the illustrative embodiment, the nail clipper 12 is generally symmetrical along the horizontal in FIGS. 9 and 10. Aspects of the rounded curvature of the body 14 can be observed for sleek and comfortable handling.

Figure 11:
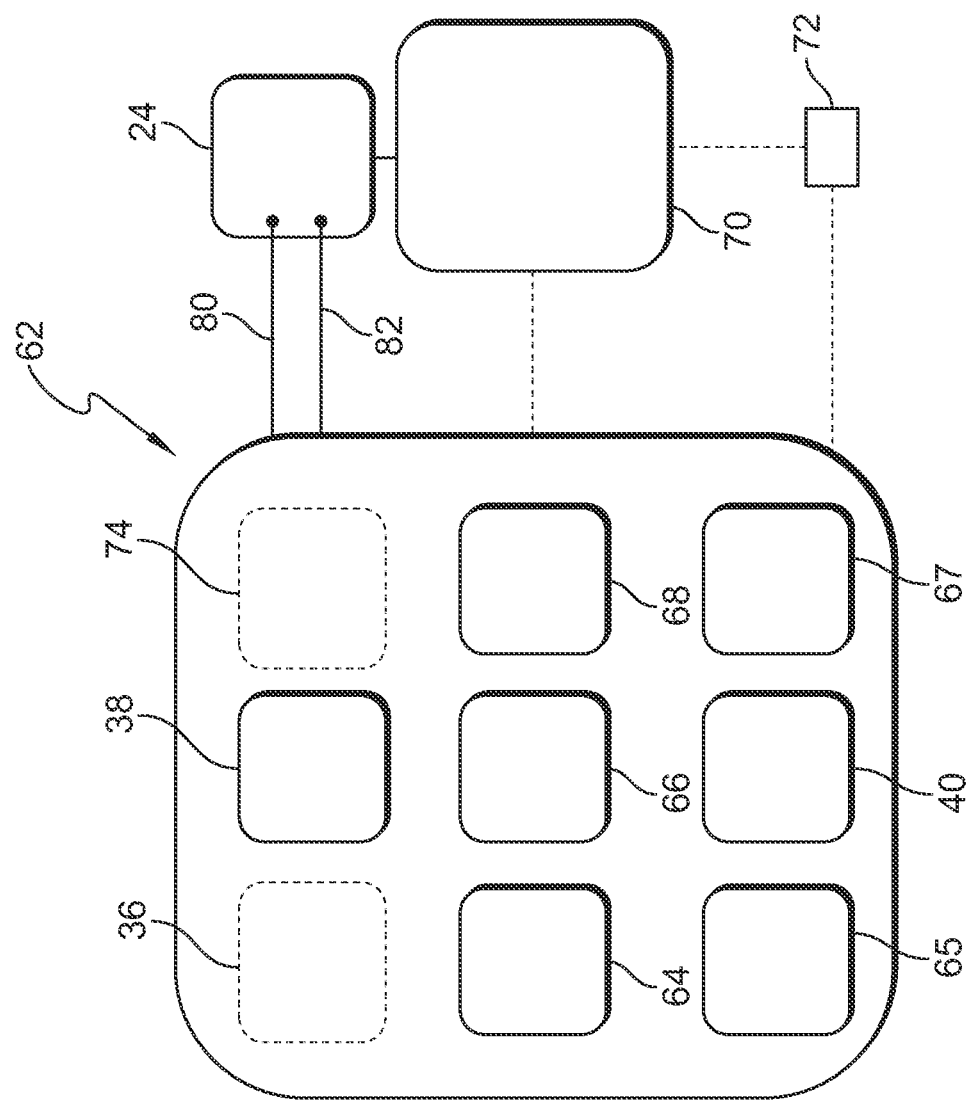
FIG. 11 is a diagrammatic view of a control system of the nail clipper of FIGS. 1-7, 9, and 10.

Referring now to FIG. 11, a control system 62 of the nail clipper 12 can govern operations of the nail clipper 12. The control system 62 includes a processor 64 for executing instructions stored on memory 66, and communication circuitry 68 for communicating signals according to direction by the processor 64. The activation button 38 is illustratively formed as part of the control system 62. The indicator 36 and/or optional lock 74 may each be formed as part of the control system, but in some embodiments, may each be formed distinctly, and arranged in communication with the control system 62.

The sensor 40 is illustratively formed as a part from the control system 62 in communication to provide signals indicating the presence of (or lack of) non-shell material, such as the subject's quick, within the clip space 22. In the illustrative embodiment, the sensor 40 communicates signals indicating information about objects within the clip space 22. The control system 62 determines whether non-shell material is present within the clip space 22, based on the information from the sensor 40 about objects within the clip space 22.

Responsive to determination that non-shell material is present within the clip space 22, the control system 62 blocks against actuation of an actuator 70. The actuator 70 is arranged mounted within the body 14 in communication with the control system 62. The nail clipper 12 includes a power source 72, embodied as a battery, mounted within the body 14. The communication circuitry 68 of the control system 62 illustratively includes power control circuitry including power circuitry (e.g., battery management system) for operation of the actuator 70. The actuator 70 is illustratively embodied as a linear actuator coupled with the blade 24 to drive the blade 24 for movement between the withdraw and clip positions. The illustrative actuator 70 is configured to provide about three lbs of drive force to drive the blade 24 for clipping. In some embodiments, the actuator 70 may include any suitable manner of actuator, for example, but without limitation a rotational actuator.

In the illustrative embodiment, the control system 62 can activate the actuator 70 to move the blade 24, when no non-shell material (i.e., no quick) is within the clip space 22. When the control system 62 determines that, based on the information from the sensor 40, no non-shell material is within the clip space 22, the actuator 70 is enabled for actuation by the activation button 38. Responsive to determination that no non-shell material is within the clip space 22, the control system 62 can communicate with the indicator 36 to communicate to the user that clipping can be performed, for example, by green light illumination as mentioned above.

By contrast, when the control system 62 determines that, based on the information from the sensor 40, non-shell material (i.e., quick) is within the clip space 22, the control system 62 blocks against activation of the actuator 70 to block movement of the blade 24 out from the withdraw position. Responsive to determination that non-shell material is within the clip space 22, the control system 62 can communicate with the indicator 36 to communicate to the user that clipping cannot be performed, for example, by red light illumination as mentioned above.

In the illustrative embodiment, the control system 62 can block movement of the blade 24 by disabling the actuator 70. For example, the control system 62 may deny power supply from the power control circuitry for activation of the actuator 70 out from the withdraw position. In some embodiments, any suitable manner of blocking against movement of the blade 24 made be applied, for example but without limitation, denying communication from the activation button 38 to activate the actuator 70.

In some embodiments, the nail clipper 12 may include an optional lock 74 operable between an unlocked position permitting movement of the blade 24 and a locked position blocking against movement of the blade 24 out from the withdraw position. The lock 74 is illustratively formed as a part of the control system 62, operable according to the control system 62 responsive to determination of non-shell material within the clip space 22 to block against movement of the blade 24 out from the withdraw position. The lock 74 is illustratively embodied to comprise a solenoid selectively operable to engage or disengage with the blade 24. In some embodiments, the lock 74 may comprise any suitable manner of physical locking device for selectively blocking movement of the blade 24 out from the withdraw position.

In FIG. 11, a power control of the control system 62 is embodied as a switch 65 for toggling of power on and off. The switch 65 is illustratively mounted on the body 14, as shown in FIG. 1. The user can operate the switch 65 between an off position to power the clipper 12 off, and an on position to power the clipper 12 on. In some embodiments, the switch 65 may have any suitable form for toggling power, including but without limitation, a button.

In FIG. 11, the clipper 12 includes a power port 67 embodied as a universal serial bus type-C port (USB-C). The power port 67 is configured to receive connection of an external power cable for powering the clipper 12 directly and/or for charging the power source 72. The power port 67 is illustratively mounted on the body 14 on an opposite side from the activation button 38, as shown in FIGS. 5 and 6.

In FIG. 11, the control system 62 can include a clipping arrest system for arresting clipping. In the illustrative embodiment, the clipping arrest system includes the blade 24 configured as a sensor. The control system 62 is arranged in electrical communication with the blade 24 via electrical feeds 80, 82 which collectively define an electrical path for flow of current. A small amount of current is passed through the blade 24 via the electrical path, and the control system 62 actively monitors the electrical path for disturbances. In the illustrative embodiment, the processor 64 can operate communication circuitry 68 to provide and monitor current through the electrical path including the blade 24.

When non-shell material contacts the blade 24, the current through the blade 24 is disturbed. For example, although the nail shell may be partly conductive itself, skin and/or the quick has greater conductance and can disturb the electrical path (e.g., voltage and/or current) through the blade 24 to detectable degree. Thus, contact between the nail shell and the blade 24 can be distinguished from contact between the quick and the blade 24. In the illustrative embodiment, the processor 64 receives indication of the disturbance in the electrical path from the communication circuitry 68 and determines whether non-shell material has contacted the blade 24.

Responsive to determination that non-shell material (e.g., the subject's quick) has contacted the blade 24, the control system 62 may arrest clipping. In the illustrative embodiment, the control system 62 arrests the actuator 70 by stopping actuation power to the actuator, responsive to determination that non-shell material has contacted the blade 24. In some embodiments, the control system 62 may arrest clipping by powered activation of the actuator 70 to drive the blade 24 to the withdraw position. In some embodiments, the control system 62 may arrest clipping by activation of an arrest actuator (e.g., lock 74) to block further movement of the blade 24 towards the clipping position. In such embodiments, the arrest actuator and/or actuator 70 may be configured to act with quick response time (e.g., less than 0.25 sec) to arrest the blade 24 from clipping. Accordingly, upon contact of between the subject's quick and the blade 24, clipping can be arrested to prevent further and/or more extensive engagement of the blade 24 with non-shell material, such as the quick or digit of the appendage, which could lead to injury.

Responsive to determination that non-shell material has contacted the blade 24, the control system 62 may operate the indicator 36 to indicate no clipping is available. For example, the indicator 36 can be de-illuminated or illuminated with red color. In some embodiments, the control system 62 may operate the indicator 36 to indicate clipping arrest by distinct warning, such as by flashing three times.

Returning briefly to FIG. 2, the sensor 40 is illustratively positioned rearward of the frame 42. The sensor 40 is arranged on a side of the frame 42 opposite the blade 24. As the sensor 40 is opposite the blade 24, the sensor 40 is arranged to detect the presence of the quick just at the opening of the clip space 22 to protect against entry of the quick into the clip space 22 without detection. In some embodiments, the sensor 40 may be arranged with any suitable position for detecting the presence of non-shell material within the clip space 22, for example but without limitation, on the same side of the frame as the blade.

Returning to FIG. 1, the nail clipper 12 includes a guide 76. The guide 76 is illustratively arranged at the clip space 22 for guiding the subject's nail in position for clipping. The guide 76 is illustratively formed of resilient material, for example, foam, and/or rubber, for providing resilient contact with the subject's nail.

The guide 76 is illustratively formed as an annular member. The guide 76 defines an opening 78 aligned with the clip space 22. The opening 78 forms an insertion space which corresponds with the clip space 22. The insertion space is configured to receive the subject's nail inserted therethrough and into the clip space 22. The subject's nail engages within the guide 76 while positioned within the clip space 22 to provide a resilient support to assist in maintaining steady position in the clip space 22.

Referring to FIG. 3, the subject's nail can be inserted into the clip space 22. The subject's nail is illustratively inserted into the clip space 22 from the rear (from inside the page in FIG. 3) such that the subject's appendage is rearward of the nail clipper 12. The control system 62 initially detects only shell material from the distal tip of the subject's nail and can operate the indicator 36 accordingly while allowing clipping operation via the activation button 38. As the subject's nail is inserted further into the clip space 22, the control system 62 may detect the presence of quick within the clip space 22, and can operate the indicator 36 to communicate no clipping is available to the groomer, while disabling clipping operations. Accordingly, safety in clipping of nails can be enhanced.

Moreover, the groomer's ease in performing clipping can be improved, whether self-grooming or grooming of another subject. By detection of the quick within the clip space 22, the groomer can more confidently perform clipping. Power actuated clipping can reduce the stress on the groomer's hands which must also steady the subject's appendage and/or digit during clipping. Reduced effort and/or stress on the groomer or subject can be reflected in the other of the groomer or subject as well, reducing the difficulties of nail clipping.

Referring now to FIG. 12, another embodiment is shown of a blade 224 and frame 242 of the nail clipper 12. The blade 224 and frame 242 are similar to the blade 24 and frame 42, respectively, and the disclosure of the blade 24 and frame 42 applies equally to the blade 224 and frame 242, respectively, except in instances of conflict with the specific disclosure of the blade 224 and frame 242, respectively. The blade 224 is shown in the withdraw position in FIG. 12. The blade 224 is coupled with the actuator 70 to receive force for movement between the withdraw and clipping positions. In FIG. 13, the blade 224 is shown in the clipping position having been driven by the actuator 70 for clipping.

Figure 14:
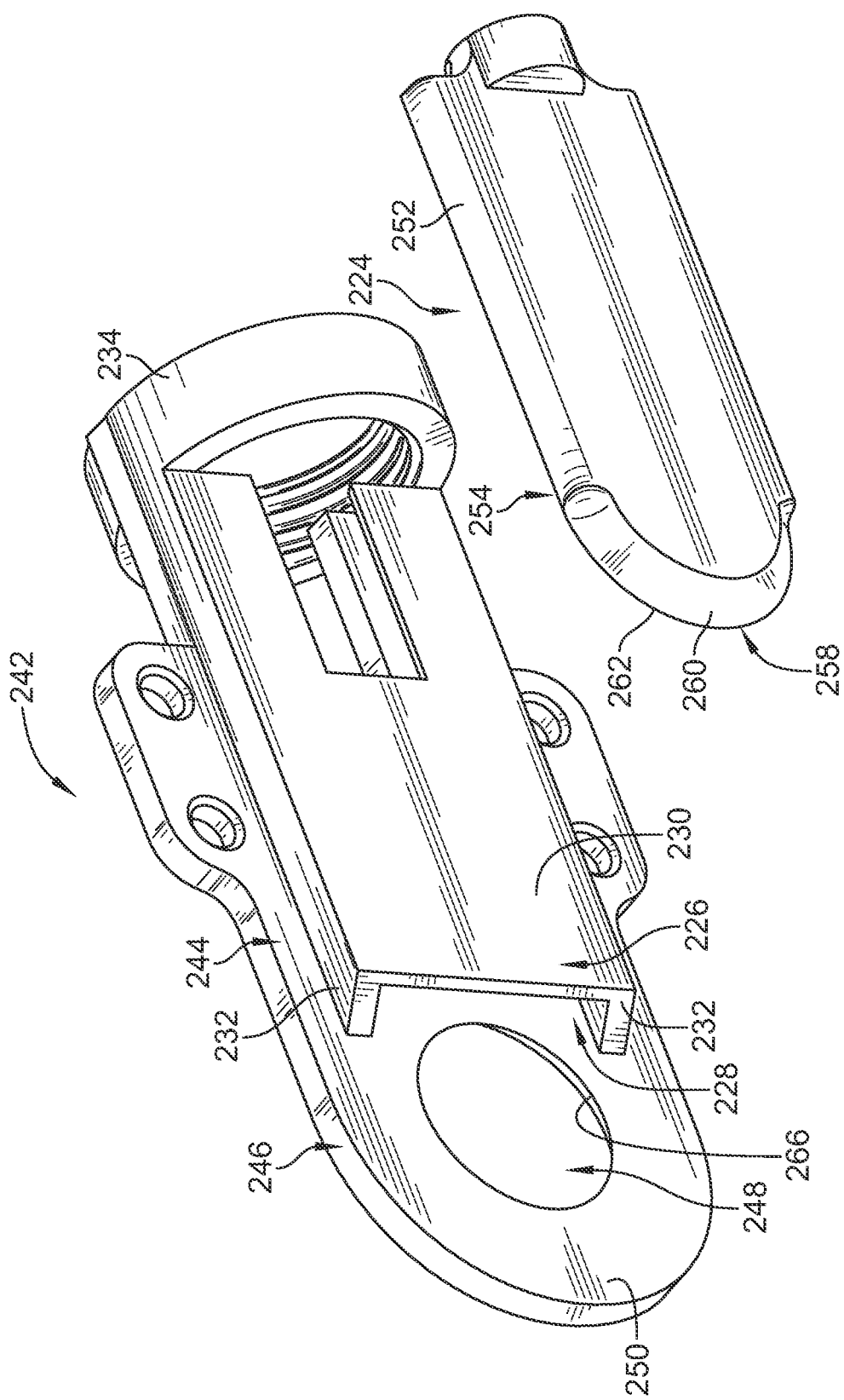
FIG. 14 is an exploded perspective view of the clipping blade and frame of FIGS. 12 and 13.

Referring to FIG. 14, the frame 224 is formed as a rigid member for maintaining the nail in position for clipping by the blade 224. The frame 242 includes a base 244 which is secured with the handle 16 of the body 14, and a head 246 extending from connection with the base 244. The frame 224 includes a carrier 226 defining a blade enclosure 228. The carrier 226 includes a cover 230 and legs 232 extending between the base 244 and the cover 230. The blade enclosure 228 is defined between the base 244 and the cover 230 of the carrier 226. The blade enclosure 228 is formed with opposite ends open for extension of the blade 224 and actuator 70 into the blade enclosure 228.

The frame 224 includes a brace 234 defined on an end opposite the head 246. The brace 234 is illustratively defined for engagement with the actuator 70 to maintain alignment of the actuator 70 and frame 224 for movement of the blade 224. The brace 234 is illustratively formed as an annular member connected on an axial side with an end of the base 244. The brace 234 is illustratively connected with an end of the carrier 226.

The head 246 of the frame 242 defines an opening 248 forming at least a portion of the clip space 22 of the nail clipper 12. The head 246 illustratively includes a rim 250 defining the opening 248. The rim 250 is illustratively formed annularly about the opening 248. The rim 250 is illustratively formed to wholly encircle the opening 248, although in some embodiments, may only partially encircle the opening 248.

In the illustrative embodiment, the frame 242 remains stationary relative to the blade 224, during movement of the blade 224 between the withdraw and clip positions, as shown in FIGS. 12 and 13. The frame 242 is positioned adjacent the blade 224. The frame 242 being in close proximity with the blade 224 such that the blade 224 is arranged to sheer with the rim 250 along the opening 248 (along the clip space 22) under movement between the withdraw and the clip positions. Sheering between the blade 224 and frame 242 can assist in clipping by the frame 242 maintaining the position of the subject's nail, for example as a stop for counterforce, while the blade 224 conducts clipping. In some embodiments, a counterforce for clipping may be provided by use of more than one blade. Although the blade 224 is arranged for shearing with the frame 242, in some embodiments, the blade 224 may be arranged with tight tolerance relative to the frame 242 without specific contact therewith for clipping.

Referring to FIG. 14, the blade 224 includes a base 252 and a head 254 extending from the base 252. The base 252 is generally arranged within the blade enclosure 228 (within the body 14) with the head 254 near the opening 228 (and thus near the clip space 22) as shown in FIGS. 12 and 13.

The blade 224 includes a blade tip 258 formed on the head 254. The blade tip 258 defines a clip surface 260 for clipping. The clip surface 260 includes a bevel and clipping edge 262. The clip surface 260 is illustratively defined with curvature. The curvature of the clip surface 260 is formed convex. The convex curvature of the clip surface 60 can assist in clipping by focusing directed force towards an initial contact point on the subject's nail, which can assist in achieving threshold clipping force, which can reduce the force required from the actuator 70.

Figure 15:
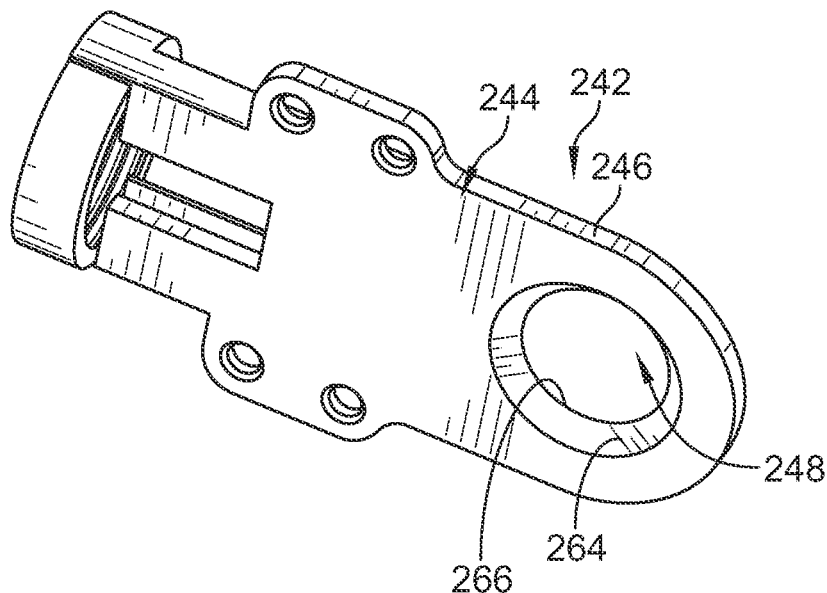
FIG. 15 is a rear perspective view of the frame of FIGS. 12-14.

Referring now to FIG. 15, the frame 242 includes a bevel 264 at the opening 248. The bevel 264 includes an interior edge 266 of the head 246 defining the opening 248. The bevel 264 is illustratively formed annularly about the opening 248. The bevel 264 and resultant edge 266 can provide a (relatively) sharp edge to assist in clipping in collaboration with the blade 224. The bevel 264 can also define a concave area for complimentary engagement of the guide 276 as discussed in additional detail below.

Figure 16:
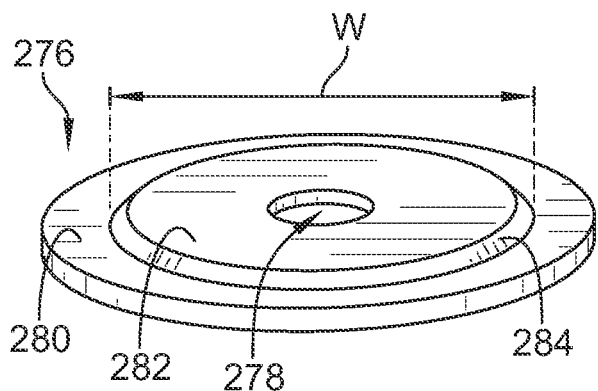
FIG. 16 is a front perspective view of another embodiment of a guide of the nail clipper of FIGS. 1-12.

Referring to FIG. 16, the nail clipper 12 can include a guide 276. The guide 176 is similar to the guide 76, and the disclosure of guide 76 applies equally to guide 276, except in instances of conflict with the specific disclosure of guide 276. Like the guide 76, the guide 276 can assist in clipping by arrangement at the clip space 22 to guide the subject's nail in position for clipping. The guide 276 is illustratively formed of resilient material, for example, foam, and/or rubber, for providing resilient contact with the subject's nail. The guide 276 is illustratively formed as an annular member. The guide 276 defines an opening 278 for arrangement aligned with the clip space 22. The opening 278 forms an insertion space which corresponds with the clip space 22. The insertion space is configured to receive the subject's nail inserted therethrough and into the clip space 22. The subject's nail engages within the guide 276 while positioned within the clip space 22 to provide a resilient support to assist in maintaining steady position of the nail within the clip space 22.

The guide 276 includes a base 280 and central platform 282 projecting from the base 280 on an axial side thereof. The central platform 282 illustratively defines a width w (illustratively a diameter) corresponding with a width defined by a portion of the bevel 264 of the frame 242, and a tapered circumferential surface 284 corresponding with the bevel 284 of the frame 242 such that the central platform 282 is received by the bevel 264 for complementary engagement with the bevel 264.

Figure 17:
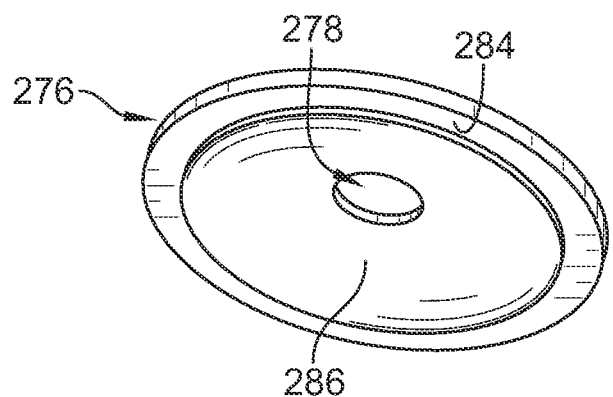
FIG. 17 is a rear perspective view of the guide of FIG. 16.

Referring to FIG. 17, the guide 276 illustratively includes a convex surface 286. The convex surface 286 is arranged on an axial side of the base 280 opposite from the central platform 282. The convex surface 286 is arranged to funnel towards the opening 278 to assist insertion of the subject's nail into the opening 278 and the clip space 22.

The present disclosure includes devices, systems, and methods for nail clipping. Nail clipping can be improved by detection of non-shell material within the space for blade movement. Responsive to detection of non-shell material, movement of the blade for clipping can be blocked. Indication that clipping is permitted can be communicated to the user to enhance confidence in proper clipping.

Although certain illustrative embodiments have been described in detail above, variations and modifications exist within the scope and spirit of this disclosure as described and as defined in the following claims.

We claim:

1. A nail clipper, comprising:
   a body frame for grasping by a user's hand, the body frame defining a clip space as an opening for insertion of a subject's nail for clipping, wherein the body frame remains stationary relative to a blade;
   a linear actuator comprising the blade coupled with the body frame for movement between a withdraw position retracted from the clip space and a clip position extended into the clip space for clipping,
   a clipping control system including a sensor system in the body frame for detecting non-shell material of a subject's nail within the clip space, and
   a guide arranged in the clip space, the guide formed of resilient material for providing resilient contact with the subject's nail for positioning within the clip space.

2. The nail clipper of claim 1, wherein the clipping control system includes an activation button on the frame body for actuation of the linear actuator providing movement of the blade between the withdraw position and the clip position.

3. The nail clipper of claim 2, wherein, responsive to user activation of the activation button, the clipping control system controls the actuator to drive the blade for movement between the withdraw position and the clip position.

4. The nail clipper of claim 1, wherein the clipping control system controls the actuator to prevent movement of the blade between the withdraw position and the clip position in response to detection of non-shell material within the clip space.

5. The nail clipper of claim 1, wherein the linear actuator is a power actuator configured to use electrical power to drive the blade.

6. The nail clipper of claim 1, wherein the clipping control system controls the actuator to prevent movement of the blade out from the withdraw position, responsive to detection of non-shell material within the clip space.

7. The nail clipper of claim 6, wherein, responsive to detection of non-shell material within the clip space, the clipping control system controls the actuator to prevent movement of the blade out from the withdraw position even under user activation of the activation button.

8. The nail clipper of claim 1, wherein the clipping control system controls the actuator responsive to detection of no non-shell material within the clip space.

9. The nail clipper of claim 1, wherein the clipping control system includes an indicator, and the control system is configured to operate the indicator on the body frame to alert the user that no non-shell material is within the clip space.

10. The nail clipper of claim 1, wherein the clipping control system includes an indicator, and the control system is configured to operate the indicator on the body frame to alert the user that non-shell material is within the clip space, responsive to detection by the sensor system of non-shell material of a subject's nail within the clip space.

11. The nail clipper of claim 1, wherein the guide defines an insertion space corresponding with the clip space to receive insertion of the subject's nail through the insertion space into the clip space.

12. The nail clipper of claim 11, wherein the guide is formed as an annular member defining the insertion space therein.

13. The nail clipper of claim 12, wherein blade is arranged to sheer with the annular member along the clip space under movement between the withdraw position and the clip position.

14. The nail clipper of claim 1, wherein the body frame includes at least one portion of the clip space, wherein the body frame formed as a rigid member for maintaining the subject's nail in position for clipping by the blade.

15. The nail clipper of claim 14, wherein the frame is arranged adjacent the blade.

\* \* \* \* \*